United States Patent [19]
Burrus

[11] 3,963,860
[45] June 15, 1976

[54] LOCKED GROOVE DETECTION AND CORRECTION IN VIDEO DISC PLAYBACK APPARATUS

[75] Inventor: Thomas William Burrus, Indianapolis, Ind.

[73] Assignee: RCA Corporation, New York, N.Y.

[22] Filed: Nov. 12, 1974

[21] Appl. No.: 522,817

[52] U.S. Cl. .......................... 178/6.6 R; 178/6.6 A; 179/100.4 D
[51] Int. Cl.² ...................... G11B 3/28; H04N 5/76
[58] Field of Search ................... 360/37, 38, 75, 77, 360/78, 33, 9; 179/100.4 D; 178/6.6 A, 6.6 DD, 6.6 R

[56] References Cited
UNITED STATES PATENTS

| | | | |
|---|---|---|---|
| 2,921,992 | 1/1960 | Bick | 179/100.4 D |
| 3,437,763 | 4/1969 | Anderson | 179/100.4 D |
| 3,706,861 | 12/1972 | Giel | 360/103 |
| 3,711,641 | 1/1973 | Palmer | 179/100.41 G |
| 3,715,524 | 2/1973 | Adler | 179/100.3 V |
| 3,787,616 | 1/1974 | Falk | 360/75 |

*Primary Examiner*—Bernard Konick
*Assistant Examiner*—Alan Faber
*Attorney, Agent, or Firm*—Eugene M. Whitacre; William H. Meagher

[57] ABSTRACT

When a "locked groove" condition is encountered in the playback of a video disc having sync signal recording locations non-radially aligned in successive groove convolutions, each initiation of a repeat reading of the same groove convolution(s) results in a timing disturbance of recovered sync signals. The disturbance is detected by an arrangement employing a phase locked loop responsive to the horizontal sync component of the recorded signal. A filtered error voltage output of the phase locked loop is applied to a voltage comparator to effect discrimination against noise and minor, transitory timing disturbances. A staircase voltage generator, responsive to the voltage comparator output, provides an output sufficient to trigger generation of a locked groove recognition pulse, when the voltage comparator threshold is exceeded a sufficient number of times within a selected time period to verify locked groove behavior and continuance. To avoid false generation of a locked groove recognition pulse under certain transient conditions (such as stylus set-down, stylus jump due to player jarring, et al.), a retriggerable one-shot is interposed between the voltage comparator and the staircase voltage generator, and provided with parameters aiding discrimination against the relatively high frequency of the repetitions of sync timing disturbances that are associated with such transient conditions. A suitable locked groove escape mechanism (e,g., a piezoelectric groove skipper element, effecting radial motion of the stylus) is activated to advance the stylus forward in its radial travel upon generaion of a locked groove recognition pulse.

11 Claims, 4 Drawing Figures

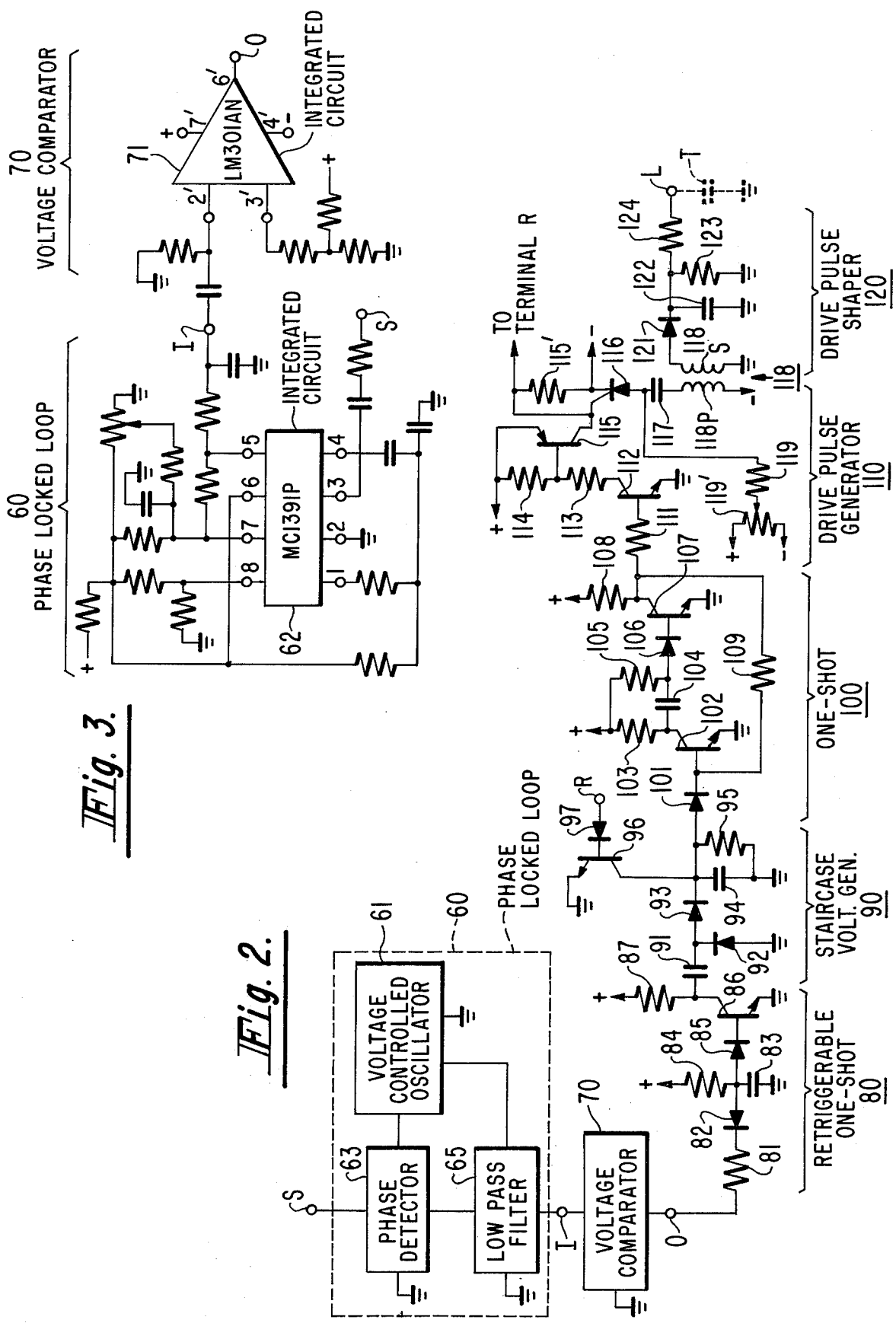

LOCKED GROOVE DETECTION AND CORRECTION IN VIDEO DISC PLAYBACK APPARATUS

The present invention relates generally to novel video disc playback apparatus and methods, and particularly to such apparatus and methods employing novel principles of detection and correction of so-called "locked groove" playback conditions involving undesired repetitions of the playback of a particular groove convolution or plurality thereof.

In U.S. Pat. No. 3,842,194, issued on Oct. 15, 1974 to Jon. K. Clemens, video disc playback systems of a variable capacitance form are disclosed. In an arrangement therein disclosed, an information track incorporates geometric variations in the bottom of a spiral groove in a disc, the surface of which comprises conductive material covered with a thin coating of dielectric material. Variations in the capacitance presented between a conductive electrode on a tracking stylus and the conductive material of the disc occur as the disc is rotated by a supporting turntable; the capacitance variations are sensed to recover the recorded information. In one particularly successful format employed for the groove bottom information track in practice of the Clemens invention, depressed areas extending across the groove bottom alternate with nondepressed areas, with the frequency of alternation varying with the amplitude of video signals subject to recording. The form of the recorded signal is thus a carrier frequency modulated in accordance with video signals.

In the playback of disc records of the aforementioned type, conditions are occasionally encountered when the presence of some form of defect in the disc groove prevents the stylus from tracking successive convolutions of the disc groove in the normal (inward-proceeding) succession. That is, as the defect is encountered, the stylus is deflected into a repeat traversal of one or more previously traversed convolutions. In some instances, the outward deflection of the stylus is repeated for a substantial number of successive encounters with the defect. This condition is herein referred to as a "locked groove" condition, producing repetitive replay of the same recorded information, with annoying effects on picture display (and accompanying sound reproduction).

In the copending application of Eugene O. Keizer, Ser. No. 522,820, filed concurrently herewith and entitled "Video Disc Record Having Spirally Aligned Sync Storage Locations And Recording/Playback Apparatus And Methods Therefor", a system is disclosed for producing records in which synchronizing information locations in successive groove convolutions are staggered in a spiral manner. In an illustrative embodiment of the Keizer system, the degree of staggering is such that in a given groove convolution, the beginning of a recorded horizontal sync pulse interval departs from radial alignment with the beginning of a recorded horizontal sync pulse interval in an adjacent groove convolution by an arcuate distance corresponding to approximately one-tenth of a record line interval.

Pursuant to the principles of the present invention, advantage is taken of the afore-said sync location staggering in providing means for automatically detecting the existence of a locked groove condition during playback of a video disc record having the Keizer format. A disturbance of the phasing of recovering sync pulses accompanies a return of the stylus to a previously traversed groove convolution. A locked groove detector, in accordance with the present invention, incorporates means responsive to the recovered sync signals for distinguishing phasing disturbances associated with a return movement of the stylus from phasing distubances due to other causes.

Pursuant to an illustrative embodiment of the present invention, such a phasing disturbance distinguishing function is performed by a phase locked loop system, responsive to the horizontal sync component of the recorded signal as recovered during disc playback, and a voltage comparator, responsive to a filtered error voltage output of the phase locked loop. The voltage comparator delivers an output impulse, when an error voltage pulse (of a polarity appropriate to the phasing shift direction encountered with stylus deflection toward a more outwardly located groove convolution) of sufficient magnitude to exceed the comparator threshold is developed by the phase locked loop. Transient phase disturbances due to noise pulses during normal playback, and minor phasing errors due to residual time base jitter, will typically not cause error voltage pulse development of a magnitude sufficient to exceed the comparator threshold. Inward stylus deflection (e.g., a skip forward) develops an error voltage pulse of the wrong polarity for comparator response.

There can be causes other than a locked groove for an outwardly directed stylus jump. Also, some locked groove type conditions are quickly self-correcting; e.g., a defect, which initially causes outward deflection of the stylus when encountered, may be cleared on a repeat encounter, with the result that normal groove convolution tracking is resumed. Pursuant to a further aspect of the present invention, a series of repeating sync phasing disturbances (each of the appropriate sense and magnitude) is required for a positive indication of true, sustained locked groove condition. In the illustrative embodiment of the present invention, the repeating distubance identification function is performed by a staircase voltage generator (responsive to the output impulses of the aforementioned voltage comparator), and recognition pulse generating apparatus with an input threshold that is exceeded by the output of the staircase voltage generator only if the staircase voltage generator receives a series of input pulses of an appropriate number (e.g., four) within a time period of appropriate length.

Under certain transient conditions encountered in disc player operation (such as may accompany stylus set-down to initiate a playback period, or which are associated with stylus position distubance due to jarring of the player, etc.), a period of random groove skipping may ensue until stylus location stabilizes in a given groove convolution. Also, at the initiation of a playback period, there is a transient period of frequency pull-in for the aforementioned phase locked loop, when a plurality of large amplitude error voltage pulses may be developed. The comparator output pulse repetition rate for the aforesaid transient conditions is typically appreciably higher than the repetition rate of the sync phasing disturbances associated with a locked groove condition (the latter rate corresponding to one disturbance per turntable revolution when the outward stylus deflection is to the adjacent convolution, and to an even slower rate when the outward stylus deflection is greater). Pursuant to an additional aspect of the present invention, the likelihood of a false locked groove indication in response to transient conditions of the aforesaid type is inhibited by providing the locked groove detector with means for discriminating against high rates of repetition of (actual or apparent) sync phasing disturbances.

In the illustrative embodiment of the present invention, such repetition rate discimination is effected by a retriggerable one-shot circuit, interposeed between the aforementioned voltage comparator and the staircase voltage generator. Impulses at the once-around rate, or slower, are repeated, one-for-one, in the output of the retriggerable one-shot circuit. A series of impulses at a significantly higher repetition rate than the once-around rate, however, is converted to a single output pulse by the retriggerable one-shot circuit.

Desirably, identification of a locked groove condition may initiate a stylus movement of a character providing relief from the locked groove condition so that normal playback may be resumed. Pursuant to another aspect of the present invention, a locked escape mechanism is actuated in response to positive locked groove identification. In the illustrative embodiment of the present invention, the escape mechanism takes the form of a piezoelectric groove skipper element effecting an inward deflection of the stylus when actuated by a waveform of appropriate magnitude, polarity and waveshape. The copending application of Marvin A. Leedom, et al., Ser. No. 499,557. filed on Aug. 22, 1974, and the copending application of H. N. Crooks, Ser. No. 522,818, filed concurrently herewith and entitled "Disc Record Groove Skipper Apparatus", illustrate several forms of groove skipper apparatus suitable for the aforesaid locked groovee escape purposes. A generally sawtooth-shaped waveform of appropriate magnitude and polarity may be derived from the output of the previously mentioned recognition pulse generating apparatus to effect groove skipper actuation.

Objects and advantages of the present invention will be recognized by those skilled in the art upon a reading of the following detailed description, and an inspection of the accompanying drawings in which:

FIG. 2 illustrates, partially schematically and partially in block diagram form, circuitry for implementing the locked groove detection and correction system of FIG. 1, in accordance with an embodiment of the present invention;

FIG. 3 illustrates schematically a circuit arrangement suitable for use in effecting the functions of the detection system elements shown in block diagram form in FIG. 2.

Figure 1:
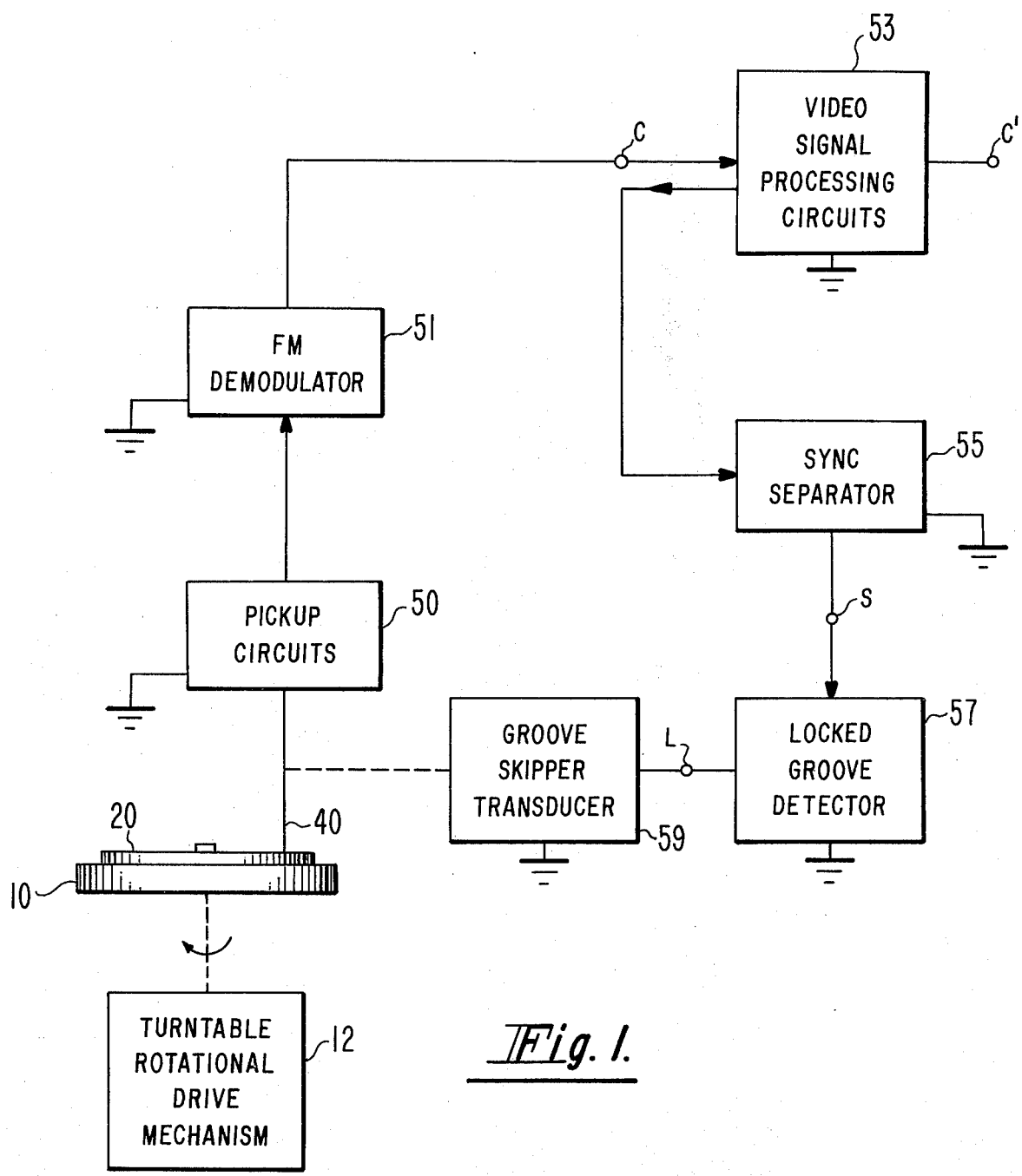
FIG. 1 illustrates, via block diagram representation, video disc player apparatus incorporating a locked groove detection and correction system pursuant to the principles of the present invention.

In FIG. 1, a portion of a video disc record player is illustrated in block diagram form to show the general arrangement of a locked groove detection and correction system pursuant to an embodiment of the present invention. A grooved video disc record 20, having spirally arranged sync signal recording locations per the format of the aforementioned Keizer application, rests upon a turntable which is rotated by a suitable rotational drive mechanism 12 at a desired playback rotational rate (e.g., 450 rpm.).

Illustratively, the disc record 20 is of the coated form discussed in the aforesaid Clemens patent, with an information track in the bottom of the record's spiral groove comprising geometrical variations representative of a carrier subject to frequency modulation by composite video signals, as previously discussed. The tip of a stylus 40 is received in the spiral groove of the disc record 20; the stylus 40 normally tracks successive convolutions of the rotating record's spiral groove, moving steadily inward toward the center of disc 20 as playback of the record progresses. To accommodate the radial travel of the stylus 40 without significantly altering stylus attitude in the record groove, a suitable radial drive mechanism (not shown) provides inward radial movement of a pickup assembly supporting the stylus 40, in appropriate synchronism with the rotational drive provided by the drive mechanism 12. Reference may be made to the copending U.S. application of F. R. Stave, Ser. No. 351,600, filed Apr. 16, 1973, now U.S. Pat. No. 3,870,835, for disclosure of an illustrative arrangement of drive mechanisms and pickup assembly for obtaining the above-mentioned, related movements of record and pickup assembly.

Per the playback approach of the aforesaid Clemens patent, the stylus 40 incorporates a conductive electrode, which cooperates with disc material to form a capacitance varying in value as the groove bottom geometry variations pass beneath the stylus. As in the Clemens patent, pickup circuits 50 are electrically coupled to the electrode of stylus 40, and serve to convert the stylus-disc capacitance variations to electrical signal variations representative of the recorded signal. Illustratively, the pickup circuits 50 may be of the advantageous form shown in the copending U.S. application of D. J. Carlson, et al., Ser. No. 451,103, filed Mar. 14, 1974, now U.S. Pat. No. 3,872,240. The output of pickup circuits 50, comprises frequency modulated carrier waves, is applied to an FM demodulator 51, serving to demodulate the modulated carrier waves to develop a composite video signal output at demodulator output terminal C.

The composite video signals appearing at terminal C are supplied to video signal processing circuits 53, which illustratively serve to process the FM demodulator output to a form suitable for application to a conventional television receiver. Where the recorded composite video signals are representative of color pictures and incorporate a chrominance component of a "buried subcarrier" form, the processing circuits may be of the advantageous form shown in the copending U.S. application of J. G. Amery, Ser. No. 506,446, filed on Sept. 16, 1974. In the form therein shown, processing of the composite color video signals includes comb filtering of the composite signals to separate the respective luminance and buried subcarrier chrominance components, frequency conversion of the chrominance component to a band location appropriate for application to color television receiver demodulators, application of the combed luminance component to a suitable video frequency de-emphasis circuit, and recombination of the de-emphasized, combed luminance component and the frequency converted, combed chrominance component to form an output composite color video signal. Illustratively, such an output signal is developed at output terminal C' of the processing circuits 53 in FIG. 1. At an appropriate intermediate point (illustratively, in the luminance component channel of the processing circuits 53, subsequent to combing and de-emphasis), another output is derived from the processing circuits 53 for application to a sync separator 55.

Sync separator 55 serves to separate the deflection synchronizing components from recovered composite signals, and develops a pulse output at terminal S corresponding to the horizontal synchronizing component of the recorded signals. A locked groove detector 57 monitors the horizontal synchronizing component output at terminal S to determine the absence or existence of a "locked groove" playback condition. Upon identification of the existence of a locked groove condition meriting correction, the detector 57 develops a transducer actuating pulse at terminal L for application to a groove skipper transducer 59. Upon actuation, transducer 59 effects deflection of the stylus 40 to a more inwardly located groove convolution for relief of the locked groove playback condition.

Illustratively, the groove skipper transducer is a piezoelectric bimorph element, such as is disclosed in the aforementioned copending Leedom, et al. application, and is associated with the pickup assembly providing support for stylus 40 in the manner described in the aforementoned copending Crooks application.

FIG. 2 illustrates a circuit arrangement which may advantageously be employed to perform the function of the locked groove detector 57 in the system of FIG. 1, pursuant to an illustrative embodiment of the present invention.

In the arrangement of FIG. 2, the separated horizontal sync component available at terminal S is applied to phase locked loop circuitry 60, the latter comprising a voltage controlled oscillator 61, a phase detector 63 responsive to an oscillator output and to sync signals from terminal S, and a lowpass filter 65 responsive to the output of phase detector 63 and developing a filter error voltage for application to oscillator 61 as a frequency control voltage therefor. A filtered error voltage output of lowpass filter 65 is also supplied to the input terminal I of a voltage comparator 70.

During normal playback operations (after a transient "pull-in" interval accompanying initiation of a playback period), the output of oscillator 61 is phase locked to the recovered sync signals. This is, the oscillator 61 is in frequency and phase synchronism with the separated horizontal sync signals supplied at terminal S, with a given (e.g., quadrature) phase relationship maintained between the respective sync and oscillator inputs to phase detector 63. Under normal playback conditions, minor deviations from the given phase relationship (due for example to noise in the sync separator output, or residual time base jitter, etc.) produce error voltage pulses at terminal I of small amplitude not exceeding the comparison thershold of voltage comparator 70.

However, when a stylus jump to a more outwardly located groove convolution occurs, a relatively large amplitude error voltage pulse appears at terminal I. During the jump, there may be a loss of sync input at terminal S, but due to the storage effect of lowpass filter 65, the oscillator 61 continues to supply an input to phase detector 63 which bears the normal phasing. Upon stylus landing in the more outwardly located groove convolution and resumption of signal delivery to terminal S, there will be a significant deviation from the normal phase relationship between the detector inputs. Successive cycles of the output of oscillator 61 (with its "remembered" phasing) will bear a phase relationship to the sync signals derived from the repeated groove convolution that deviates significantly from normal (the amount of deviation being determined by the degree of sync location staggering employed in the record, and the magnitude of the outward stylus jump). For an illustrative example, the record's degree of horizontal sync location staggering for adjacent convolutions will be assumed to be the aforesaid one-tenth of a line interval, and an outward deflection to the next adjacent convolution will be assumed for the stylus jump magnitude. For such assumptions, the phase deviation will be approximately 36°. Illustratively, the sense of the phase deviation is a phase advance of the recovered sync signals (as will be the case, for example, when the sync staggering is chosen for the purpose delineated in the aforesaid Keizer application). A phase deviation of the noted order will continue for a period (as determined by the low-pass characteristic of filter 65) and then gradually diminish as the frequency of oscillator 61 adjusts to reduce the deviation.

The consequent filtered error voltage pulse developed at terminal I will be of relatively large peak amplitude, with a given polarity representative of the noted sync pulse phase advance. The voltage comparator 70 is poled for response to the given polarity, and the comparison threshold is set at a level exceeded by the pulse peak under the noted circumstances. When the input of the given polarity exceeds the comparison threshold of comparator 70, an output is developed at comparator output terminal 0, the pulse having a substantially fixed amplitude and a width corresponding to the interval during which the input exceeds the threshold. Illustratively, the comparator 70 is not responsive to inputs of a polarity opposite to the given polarity. Thus, when the stylus skips forward (e.g., jumps to the more inwardly located adjacent convolution), and a sync signal phase lag results, the relatively large amplitude error voltage pulse produced at terminal I will not cause output pulse development at terminal 0, since comparator 70 is not responsive to pulses of the polarity representative of sync phase lag.

In the circuit arrangement of FIG. 2, a retriggerable one-shot 80 is responsive to the output pulses developed by comparator 70 at terminal O, which are illustratively negative-going. The retriggerable one-shot 80 includes an NPN transistor 86, with its collector connected to a positive potential source by a resistor 87, and its emitter grounded. The transistor 86 is biased to be normally conducting, with a resistor 84 and a diode 85 series connected between the positive potential source and the base of transistor 86. The diode 85 is poled in the same direction as the base-emitter diode of transistor 86 in the biasing current path. A capacitor 83 shuts the series combination of the diode 85 and the base-emitter path of transistor 86. A resistor 81 is connected between terminal 0 and the cathode of a diode 82, with the anode of diode 82 connected to the junction of resistor 84 and capacitor 83. Resistor 81 has a resistance value which is much smaller than the resistance value of resistor 87.

Illustratively, output terminal 0 is normally at a positive potential of sufficient magnitude as to maintain diode 82 normally non-conducting. When the comparison threshold is exceeded, terminal 0 swings to a negative potential, allowing diode 82 to conduct. Capacitor 83, normally charged to a positive potential, rapidly charges to a negative potential via the low impedance path provided by resistor 81 and conducting diode 82. This change in potential across capacitor 83 results in the cutoff of diode 85 and transistor 86. When the comparator output pulse terminates, and terminal 0 returns to a positive potential, diode 82 again becomes non-conducting. However, transistor 86 does not immediately return to conduction, because the charge storage in capacitor 83 holds the transistor 86 in a non-conducting state, until recharge of capacitor 83 to a suitable positive potential via resistor 84 can take place. Thus, for a given minimum time period (as determined by the time constant of resistor 84 and capacitor 83) following the end of the comparator output pulse, transistor 86 will continue to be held off.

At the end of the given minimum time period, if a succeeding comparator output pulse has not intervened, the potential across capacitor 83 will be sufficiently positive to permit forward conduction in diode 85 and the base-emitter path of transistor 86, and transistor 86 will return to the conducting state. When succeeding comparator output pulses do intervene, conduction of transistor 86 is postponed until a pulse-free minimum period does occur. The length of the aforesaid minimum time period for continued hold-off of transistor 86 is chosen to be less than the time required for one full revolution of the disc during record playback (i.e., less than 2/15 sec. for the illustrative rotation rate of 450 rpm). However, for purposes explained subsequently, the minimum time period choice corresponds to a substantial fraction of said revolution period, with an illustrative choice being 1/11th of a second.

The output of the retriggerable one-shot 80 is applied to a staircase voltage generator 90. The staircase voltage generator 90 includes a diode 93, a capacitor 91 connected between the diode anode and the collector of transistor 86, and a capacitor 94 connected between the diode cathode and ground. The capacitance value of capacitor 91 is appreciably smaller than the capacitance value of the capacitor 94. A diode 92 is also included, with its anode grounded and with its cathode connected to the junction of capacitor 91 and diode 93. A large-valued resistor 95 is connected in shunt with capacitor 94.

When an initial output pulse of comparator 70 appears at terminal 0 to trigger one-shot 80, the junction of resistor 87 and capacitor 91, previously clamped to ground potential by the conducting transistor 86, is free to rise in potential. The capacitors 91 and 94 are then charged from the positive potential source via a charging path including resistor 87 and the now forwardly biased diode 93. The charging time constant is short relative to the minimum hold-off period for transistor 86, so that essentially complete charging is effected. The charging potential (source potential minus the voltage drop across forward biased diode 93) divides across capacitors 91 and 94 in inverse proportion to their respective capacitance values. When conduction by transistor 86 resumes, capacitor 91 rapidly discharges via a path including conducting transistor 86 and diode 92. Capacitor 94, however, remains charged at a predetermined fraction of the source potential, diode 93 being biased to a nonconducting state, and resistor 95 representing a high impedance to discharge current and permitting only a very slow discharge of capacitor 94.

If a succeeding output pulse is developed by comparator 70 sufficiently soon after the return of transistor 86 to conduction, an additional step of charge is added to the charge retained by capacitor 94. The potential across capacitor 94 may thus build up in a staircase fashion, in response to a sequence of comparator output pulses of appropriate timing.

A one-shot 100 is triggered when the potential across capacitor 94 exceeds a threshold level, corresponding to the potential required to establish conduction in the series combination of a diode 101 and the base-emitter path of the one-shot circuit's input transistor 102, which series combination is shunted across capacitor 94. A resistor 103 is connected between the collector of the NPN input transistor 102 and the positive potential source. The resistor 103 is shunted by the series combination of resistor 105 and capacitor 104. Diode 106 and the base-emitter path of the one-shot circuit's output transistor 107 are connected in series between the junction of resistor 105 and capacitor 104 and ground. The collector of the NPN output transistor is connected via a resistor 108 to the positive potential source, and via a feedback resistor 109 to the base of input transistor 102.

Input transistor 102 is normally non-conducting, while diode 106 and output transistor 107 are normally conducting, forward bias for diode 106 and the base-emitter path of transistor 107 being supplied from the positive potential source via resistor 105. Capacitor 104 is charged under these conditions, with its diode-connected plate negative relative to its other plate (which is connected to the collector of non-conducting transistor 102). When the output of staircase voltage generator 90 initiates conduction in transistor 102, the drop in potential at its collector drives diode 106 and transistor 107 toward cutoff. Positive feedback to the base of transistor 102 (via resistor 109) of the resultant rise in potential at the collector of transistor 107 results in rapid switching of the one-shot circuit to a state in which diode 106 and transistor 107 are held in cutoff by the potential across capacitor 104, and transistor 102 is held in conduction by forward bias supplied via resistors 108 and 109. This state persists for the time period required for charging current flowing in resistor 105 to reverse the potential across capacitor 104 and re-establish sufficient forward bias across diode 106 and the base-emitter path of transistor 107 to return transistor 107 to conduction. When the collector of transistor 107 drops sufficiently close to ground potential, transistor 102 returns to its normal cut-off state.

A positive-going output pulse is thus developed by one-shot 100 at the collector of output transistor 107, with the output pulse width (e.g., 110 milliseconds) determined by choice of the time constant of the RC combination of capacitor 104 and resistor 105. The output of one-shot 100 is supplied to a drive pulse generator 110.

The drive pulse generator 110 includes a normally non-conducting input transistor 112. The series combination of resistor 111 and the base-emitter path of the NPN input transistor 112 is shunted across the collector-emitter path of transistor 107. Transistor 112 is normally held off by the conduction of transistor 107, but is permitted to conduct during the one-shot output pulse development when transistor 107 is cut off. The collector of transistor 112 is connected to the positive potential source via resistors 113 and 114 in series. The base of a PNP transistor 115 is connected to the junction of resistors 113 and 114, and the emitter is returned to the positive potential source. The collector of transistor 115 is connected to a negative potential source by resistor 115'.

The transistor 115 is normally non-conducting but is turned on by the conduction of transistor 112. The collector of transistor 115 is thereby swung from the negative source potential to the potential of the positive source. This swing appears across the gate-cathode path of an SCR 116 to trigger the SCR 116 into conduction. The cathode of SCR 116 is connected to the negative potential source, while the anode of SCR 116 is connected by resistor 119 to the adjustable tap of a potentiometer 119', having its fixed terminals connected to the respective positive and negative potential sources. Tap adjustment provides control of the amplitude of the generator's output pulse which is developed by a step-up transformer 118, having its primary winding 118P connected in series with a capacitor 117 across the anode-cathode path of SCR 116.

The voltage pulse developed across primary winding 118P, in response to the triggering of SCR 116, appears with a stepped-up voltage level across secondary winding 118S, and with a polarity causing conduction in diode 121, which is connected in series with a capacitor 122 across the secondary winding 118S. A resistor 123 shunts capacitor 122. A resistor 124 couples the junction of diode 121 and capacitor 122 to the groove skipper transducer's input terminal L. When the transducer takes the illustrative form of a piezoelectric bimorph element, as previously mentioned, it appears as a capacitive load to the drive circuit, and is accordingly represented in the schematic of FIG. 2 by capacitance T coupled between terminal L and ground.

Figure 4:
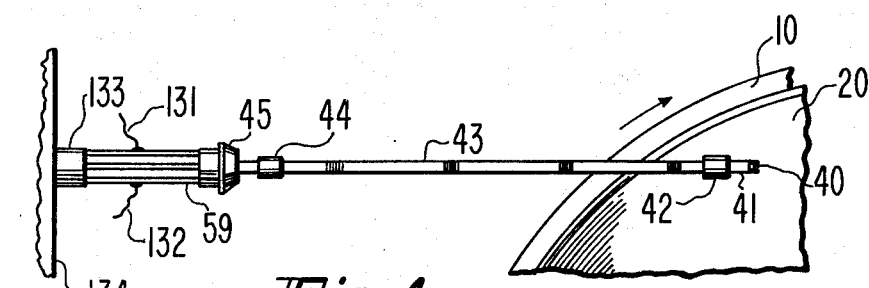
FIG. 4 provides an elevation view of a portion of player apparatus incorporating a locked groove escape mechanism, which may illustratively be employed with the circuitry of FIGS. 2 and 3 to complete the system of FIG. 1.

A waveform of generally sawtooth-like shape is developed across capacitor 122 in response to the transformer output pulse, as the capacitor is charged relatively rapidly via the conducting diode 121, and discharged relatively slowly through the shunt resistor 123. The transducer actuating waveform developed across capacitance T is also of the aforesaid sawtooth-like shape, but is provided with a longer rise time, as determined by the additional charging impedance presented by resistor 124. An illustrative rise time value, found appropriate for actuation of a groove skipper of the form shown in FIG. 4, is 10 milliseconds. Discharge of the transducer capacitance T is effected via resistors 124 and 123 in series.

When a drive pulse is developed by generator 110, the voltage at the collector of PNP transistor 115 swings from a negative potential to a positive potential, as previously described. This potential swing is relied upon to effect a resetting of the output of staircase voltage generator 90 to a base (e.g., ground) potential. A reset circuit input terminal R is directly connected to the collector of transistor 115, and to the anode of a diode 97. The cathode of diode 97 is connected to the base of an NPN reset transistor 96, which has its emitter grounded. The collector-emitter path of reset transistor 96 is shunted across the staircase output capacitor 94 of a generator 90. The reset transistor 96 is normally held in a non-conducting state by a negative potential at terminal R, but is rendered conducting upon drive pulse development by generator 110 so as to discharge capacitor 94, thereby allowing staircase voltage generator 90 to accommodate a new charge buildup cycle.

From the foregoing description, it will be seen that the system of FIG. 2 does not associate groove skipper transducer actuation with each output pulse development by comparator 70. Rather, it is necessary that there be a sequence of such output pulses, and the time consumed in completing the sequence cannot be too great, if actuation is to take place. Illustratively, triggering of one-shot 100 may be caused to occur when generator 90 is pulsed at least four times within a period of approximately 3 seconds. For the illustrative rotation rate of 450 rpm, such a threshold setting will ensure that locked groove conditions involving outward stylus deflection of even several more than one groove convolution will result in transducer actuation upon the fourth outward stylus jump.

The requirement for a sequence appearance before transducer actuation aids in positive identification of locked groove conditions, and avoids introduction of a stylus forward jump in the instance of random, isolated occurrences of a stylus backward jump. The requirement is also of aid in avoiding transducer actuation under certain transient conditions that simulate locked groove conditions but do not require a forward jump form of correction, particularly when the charge accumulator is driven by apparatus of the above-discussed retriggerable one-shot type. The retriggerable one-shjot 80 discriminates against comparator output pulse sequences of repetition rates that are higher than just above the rate of one per disc revolution, by converting such sequences to a single output pulse that does not meet the pulse sequence requirement of the staircase voltage generator 90. False groove lock identification during the transient conditions surrounding stylus set-down, for example, or player jarring, for another example, are thus avoided.

A variety of circuit arrangements may be employed in achieving the function of the phase locked loop 60 and the voltage comparator 70. A specific illustrative example, employing commercially available integrated circuit chips, is shown schematically in FIG. 3. As shown therein, an integrated circuit 62, of the commercially available type MC1391P, is employed with appropriate external components to perform the functions of phase locked loop 60, responding to separated sync signals at terminal S, and delivering a filtered error voltage to the input terminal I of voltage comparator 70. The functions of voltage comparator 70 are performed in the illustrative circuit arrangement by a comparator chip 71 of the commercially available type LM301AN, responding to the error voltage at terminal I and developing the desired comparator output pulses at terminal 0.

In FIG. 4, a pickup assembly incorporating a groove skipper transducer of the previously mentioned piezoelectric bimorph element type, is partially illustrated. As shown in the plan view of FIG. 4, a stylus 40 is received in a spiral groove of a disc record 20 resting upon a rotating turntable 10. The stylus is held by a stylus holder 41 at one end of the latter. The holder 41 is pivotally supported at its other end by a compliant support 42, which is secured to one end of an elongated pickup arm 43. The arm 43 is pivotally supported at its opposite end by a second compliant support 44, which is secured to one member of a releasable coupler assembly 45 (illustratively, of a magnetic coupler type). A second portion of the coupler assembly 45 (illustrated in assembled condition) is secured to one end of a piezoelectric bimorph element 59. The other end of element 59 is secured to a projection 133 of a supporting structure 134, which may illustratively comprise an "armstretcher" transducer of the type shown in U.S. Pat. No. 3,711,641 issued to R. C. Palmer, and supply translatory motion to arm 43 to move the stylus longitudinally in the record groove in opposition to errors in relative stylus-groove motion. Leads 131 and 132 are secured to respective outer electrodes of the piezoelectric element 59 to permit actuating waveform application thereto from a drive circuit such as is shown in FIG. 2.

When actuated, the piezoelectric bimorph element 59 flexes to pivot the arm 43, to thereby provide an inward radial motion of stylus 41 for relief of a locked groove condition. Reference may be made to the aforesaid Crooks application for a more detailed description of this form of groove skipper transducer apparatus.

It may be noted that in the FIG. 2 circuit, respective series resistors (not shown) are desirably incorporated in the connections from the collector of transistor 115 to (a) the gate of SCR 116, and (b) reset terminal R.

What is claimed is:

1. In video disc playback apparatus for use with a video disc having a spiral information track containing representations of recorded composite video signal information inclusive of regularly recurring sync signals with sync signal recording locations non-radially aligned in successive convolutions of the spiral track; said playback apparatus including a signal pickup for sensing said information representations along said spiral information track as said disc is rotated, and means coupled to said signal pickup for providing a composite video signal output corresponding to the recorded information sensed by said signal pickup, wherein normal operation involves the sensing of said information representations along successive convolutions of said spiral track in a regular progression toward one spiral extremity; the combination comprising:
   means, responsive to the composite video signal output of said output providing means, for separating said sync signals from other components of said composite video signal;
   a voltage controlled oscillator;
   a phase detector, responsive to said separated sync signals and to an output of said oscillator, for developing an output having an amplitude and a polarity indicative of the magnitude and sense, respectively, of departures, if any, from a predetermined phase relationship between said separated sync signals and said oscillator output;
   a low pass filter responsive to said phase detector output for developing an error voltage;
   means for applying said error voltage to said oscillator to vary the frequency thereof in a direction tending to oppose said departures from said predetermined phase relationship; and
   means for developing an output pulse indicative of a disruption of said regular progression by a shift of the radial location of said signal pickup sensing in a direction away from said one spiral extremity;
   said output pulse developing means including a voltage comparator responsive to said error voltage and providing said output pulse only when said error voltage is indicative of a given sense of departure from said predetermined phase relationship and reaches an amplitude exceeding a selected threshold level.

2. Apparatus in accordance with claim 1 also including:
   means for shifting the radial location of sensing by said signal pickup in a direction toward said one spiral extremity; and
   means responsive to output pulses provided by said voltage comparator for actuating said shifting means.

3. In video disc playback apparatus for use with a video disc having a spiral information track containing representations of recorded composite video signal information inclusive of regularly recurring sync signals with sync signal recording locations non-radially aligned in successive convolutions of the spiral track; said playback apparatus including a signal pickup for sensing said information representations alone said spiral information track as said disc is rotated, and means coupled to said signal pickup for providing a composite video signal output corresponding to the recorded information sensed by said signal pickup, wherein normal operation involves the sensing of said information representations along successive convolutions of said spiral track in a regular progression toward one spiral extremity; the combination comprising:
   means, responsive to the composite video signal output of said output providing means, for separating said sync signals from other components of said composite video signal;
   a voltage controlled oscillator;
   a phase detector, responsive to said separated sync signals and to an output of said oscillator, for developing an output having an amplitude and a polarity indicative of the magnitude and sense, respectively, of departures, if any, from a predetermined phase relationship between said separated sync signals and said oscillator output;
   a low pass filter responsive to said phase detector output for developing an error voltage;
   means for applying said error voltage to said oscillator to vary the frequency thereof in a direction tending to oppose said departures from said predetermined phase relationship;
   means for developing an output pulse indicative of a disruption of said regular progression by a shift of the radial location of said signal pickup sensing in a direction away from said one spiral extremity;
   said output pulse developing means including a voltage comparator responsive to said error voltage and providing said output pulse only when said error voltage is indicative of a given sense of departure from said predetermined phase relationship and reaches an amplitude exceeding a selected threshold level;
   means for shifting the radial location of sensing by said signal pickup in a direction toward said one spiral extremity;
   means responsive to output pulses provided by said voltage comparator for actuating said shifting means; wherein said actuating means includes:
   a normally disabled drive pulse generator;
   means for enabling said drive pulse generator in response to the appearance of a plurality of input impulses within a time period of selected duration;
   means responsive to output pulses provided by said voltage comparator for developing said input impulses; and
   means for supplying the output of said drive pulse generator to said shifting means.

4. Apparatus in accordance with claim 3 wherein said input impulse developing means comprises a retriggerable one shot subject to triggering from a first state to a second state by an output pulse provided by said voltage comparator, and subject to a return to said first state when a given time period has elapsed following the termination of said triggering without a succeeding output pulse development, said given time period being less than the time required for a full revolution of said disc record playback.

5. Apparatus in accordance with claim 4 wherein said separated sync signals comprise horizontal synchronizing information nominally recurring at a given line rate, wherein said lowpass filter has a cutoff frequency which is low relative to said line rate, and wherein said given time period is several orders of magnitude longer than a period at said line rate.

6. Apparatus in accordance with claim 5, for use with a video disc having said information track formed in a spiral groove of a surface of said disc, wherein said signal pickup comprises a stylus having a groove-entering tip and a pickup arm for supporting said stylus, and wherein said shifting means comprises a piezoelectric element coupled to said pickup arm for effecting movement of said stylus in a radially inward direction upon actuation by the output of said drive pulse generator.

7. In a video disc record player for use with a video disc record having a spiral groove in a band encircling the center of said disc, said spiral groove containing an information track comprising geometric variations along the bottom of said groove representative of recorded composite video signal information inclusive of horizontal sync signals nominally recurring at a given line repetition rate, the sync signal recording locations in said track being spirally aligned in successive convolutions of said groove spiral; said player including (1) a stylus, having a tip subject to reception in said groove, and forming a capacitance with said disc which varies in accordance with the geometric variations of said track passing beneath said stylus as said disc is rotated, (2) a pickup arm upon which said stylus is mounted, and (3) means responsive to said capacitance variations for recovering the recorded composite video signals; the combination cmprising:
 a sync signal separator for separating said horizontal sync signals from said recovered composite video signals;
 an oscillator;
 means for developing an error voltage indicative of the magnitude and sense of deviations from a given phase relationship between said separated horizontal sync signals and an output of said oscillator;
 means for controlling the frequency of said oscillator in accordance with said error voltage;
 a voltage comparator coupled to said error voltage developing means for developing an output impulse only when said error voltage is indicative of a given deviation sense and exceeds a given amplitude;
 a staircase voltage generator;
 a normally disabled purse generator subject to being enabled when the output of said staircase voltage generator exceeds a selected threshold level;
 means for effecting a movement of stylus toward said disc center, said movement effecting means being subject to actuation upon said enabling of said pulse generator; and
 means responsive to the output of said voltage comparator for pulsing said staircase voltage generator.

8. Apparatus in accordance with claim 7 wherein said pulsing means comprises a retriggerable one shot.

9. Apparatus in accordance with claim 8 wherein said retriggerable one shot is subject to triggering from a first state to a second state by an output impulse developed by said voltage comparator, and subject to a return to said first state when a given time period has elapsed following the termination of said triggering without a succeeding output impulse development, said given time period being less than the time required for a full revolution of said disc during playback of said record.

10. Apparatus in accordance with claim 9 wherein said error voltage developing means comprises a phase detector responsive to said separated sync signals and to said oscillator output, and a lowpass filter responsive to the output of said phase detector; wherein said lowpass filter has a cutoff frequency which is low relative to said line repetition rate; and wherein said given time period is longer than the time required for a half revolution of said disc during playback of said record.

11. In video disc playback apparatus for use with a video disc record having a spiral groove in a band encircling the center of said disc, said spiral groove containing an information track comprising geometric variations along the bottom of said groove representative of recorded composite video signal information inclusive of horizontal sync signals nominally recurring at a given line repetition rate, the sync signal recording locations in said track being spirally aligned in successive convolutions of said groove spiral, said playback apparatus including (1) a stylus, having a tip subject to reception in said groove, and forming a capacitance with said disc which varies in accordance with the geometric variations of said track passing beneath said stylus as said disc is rotated, (2) a pickup arm upon which said stylus is mounted, and (3) means responsive to said capacitance variations for recovering the recorded composite video signals; wherein normal operation of said playback apparatus involves stylus traversal of successive convolutions of said groove spiral in a regular progression toward one spiral extremity; the combination comprising:
 means, responsive to the recovered composite video signals, for separating said horizontal sync signals from other components of said recovered composite video signals;
 a voltage controlled oscillator;
 a phase detector, responsive to said separated sync signals and to an output of said oscillator, for developing an output having an amplitude and a polarity indicative of the magnitude and sense, respectively, of deviations from a given phase relationship between said separated sync signals and said oscillator output;
 a low pass filter responsive to said phase detector output for developing an error voltage;
 means for applying said error voltage to said oscillator to vary the frequency thereof in a direction tending to oppose said deviations from said given phase relationship; and
 means for developing an output pulse indicative of a disruption of said regular progression by a shift of the radial location of said stylus in a direction away from said one spiral extremity;
 said output pulse developing means including a voltage comparator responsive to said error voltage and providing said output pulse only when said error voltage is indicative of a given sense of deviation from said given phase relationship and reaches an amplitude exceeding a selected threshold level.

* * * * *